(12) United States Patent
Pierrou

(10) Patent No.: US 6,692,217 B1
(45) Date of Patent: Feb. 17, 2004

(54) LIFTABLE PLATFORM HAVING ISOLATED HYDRAULICALLY-MOVEABLE ROLLSTOP

(75) Inventor: James R. Pierrou, Winamac, IN (US)

(73) Assignee: The Braun Corporation, Winimac, IN (US)

(*) Notice: Subject to any disclaimer, the term of this patent is extended or adjusted under 35 U.S.C. 154(b) by 0 days.

(21) Appl. No.: 09/525,096

(22) Filed: Mar. 14, 2000

Related U.S. Application Data

(60) Provisional application No. 60/134,096, filed on Apr. 29, 1999.

(51) Int. Cl.[7] .................................................. B60P 1/02
(52) U.S. Cl. ........................ 414/539; 414/546; 414/921
(58) Field of Search ................................. 414/546, 556, 414/557, 921, 539, 540; 187/222

(56) References Cited

U.S. PATENT DOCUMENTS

| | | | |
|---|---|---|---|
| 3,638,813 A | | 2/1972 | Strong |
| 4,273,217 A | * | 6/1981 | Kajita .................... 280/166 X |
| 4,347,030 A | * | 8/1982 | Kingston .................... 414/556 |
| 4,466,771 A | | 8/1984 | Thorley et al. |
| 4,556,128 A | * | 12/1985 | Thorley et al. ......... 414/540 X |
| 4,576,539 A | * | 3/1986 | Williams ................ 414/921 X |
| 4,763,487 A | | 8/1988 | Wicks |
| 5,271,707 A | | 12/1993 | Derksen et al. |
| 5,284,414 A | | 2/1994 | Kempf |
| 5,848,656 A | | 12/1998 | Moksvold |
| 5,864,101 A | | 1/1999 | Nishizawa et al. |
| 6,648,579 B2 | * | 11/2003 | Vartanian, Sr. ............. 414/546 |
| 2001/0031195 A1 | * | 10/2001 | Dupuy et al. ............... 414/546 |
| 2001/0036397 A1 | * | 11/2001 | Pierrou et al. .............. 414/540 |

FOREIGN PATENT DOCUMENTS

| | | | | |
|---|---|---|---|---|
| WO | WO 00/66394 A1 | * | 11/2000 | ............ B60P/1/44 |

* cited by examiner

Primary Examiner—James W. Keenan
(74) Attorney, Agent, or Firm—Michael Best & Friedrich LLP

(57) ABSTRACT

The present invention relates to hydraulic circuit capable of independently controlling a plurality of hydraulic cylinders or actuators. The hydraulic circuit includes a set of independently energizable valves fluidically positioned in the circuit and capable of, when selectively energized and de-energized, functionally isolating specific circuit elements. In one preferred embodiment, the present invention relates to a hydraulic circuit for independently controlling the stowage functions, vertical movement, and rollstop operations of a wheelchair-lifting platform. Another preferred embodiment of the present invention relates to a wheelchair lifting platform having a lifting cylinder and a rollstop cylinder and incorporating a hydraulic circuit capable of independently actuating and controlling the respective cylinders.

4 Claims, 4 Drawing Sheets

LIFTABLE PLATFORM HAVING ISOLATED HYDRAULICALLY-MOVEABLE ROLLSTOP

CROSS-REFERENCE TO RELATED APPLICATIONS

This application claims priority to U.S. Provisional Application Serial No. 60/134,096 filed Apr. 29, 1999.

TECHNICAL FIELD OF THE INVENTION

The present invention relates generally to hydraulic circuitry and, more particularly, to a hydraulic circuit for isolating a lifting cylinder from a secondary hydraulic rollstop cylinder in a wheelchair lift mechanism.

BACKGROUND OF THE INVENTION

Hydraulic lifting devices for transporting wheelchairs into and/or out of automotive vehicles are well known in the art. Typically, these devices include a movable platform and either a hydraulic or a mechanical mechanism for folding and unfolding the platform to and from a stored position and for moving the platform between a street level and a vehicle entry level. Known wheelchair lifting platforms also typically include a rollstop gate, which is a moveable gate that, when engaged, prevents the wheelchair from accidentally rolling off of the platform while it is raised or in motion. The rollstop gate may also be either mechanically or hydraulically actuated.

Mechanically actuated rollstop gates depend upon the movement of the platform to deploy (close) and/or fold (open) the rollstop gate. Such mechanically actuated rollstop gates have certain disadvantages, including a tendency of the gate to stick in the open position while the lift is off of the ground, as well as the general requirement that the platform move up from the ground several inches in order to actuate the closing of the gate.

In contrast, hydraulically actuated rollstop gates may be opened and closed independently of the motion and/or position of the platform because the rollstop gate can be fluidically coupled to a set of hydraulic cylinders. The positive pressure in the cylinders can also be used to lock the gate in the closed position, enhancing wheelchair passenger safety.

One disadvantage of a first type of known hydraulic wheelchair lifting platforms using a single hydraulic circuit to control both the platform lifting operations and the rollstop gate opening and closing operations becomes apparent when the extended end of the platform engages an obstacle, such as a curb, during lowering. This positioning of the platform is known as "bridging". When the lowering process is completed, the platform becomes tilted towards the vehicle, requiring the wheelchair to travel uphill to disembark. If only one corner of the extended end of the ramp becomes hung up on an obstacle, the ramp may twist, making disembarkment difficult. These problems may be addressed by locking the hydraulic lifting cylinders to keep the platform level upon prematurely engaging a curb or other obstacle before the lowering cycle is completed; however, the rollstop gate then cannot be opened because the gate is hydraulically coupled to the locked hydraulic lifting cylinders. In such a situation, it is impossible to move hydraulic fluid out of the secondary hydraulic rollstop cylinder to open the rollstop gate when the lifting cylinder is hydraulically locked into position, because the known single-circuit wheelchair platform lifting systems are unable to hydraulically isolate the lifting cylinders from the secondary hydraulic rollstop cylinder such that the secondary hydraulic rollstop cylinder may be hydraulically actuated independently of the lifting cylinders. The wheelchair passenger is thus prevented from exiting the bridged platform that has not completed its prescribed descent cycle.

A second type of known hydraulic wheelchair lifts use a dual set of hydraulic circuits, one controlling the lifting function and one controlling the rollstop function. The disadvantage inherent in such systems is that the requirement of independent hydraulic circuits for separately controlling the folding/unfolding operation, the raising/lowering operation, and the rollstop opening/closing operation increases the complexity, bulk, and cost of the lifting platform. None of the known systems isolate the above-mentioned functions absent the use of multiple, independent hydraulic circuits.

It is advantageous to combine these functions into a single hydraulic system to minimize the bulk, weight, complexity and cost of the wheelchair-lifting platform. It is more advantageous to be able to operate the combined functions independently of each other. For example, the elevation of the ground may not always be a constant, requiring the wheelchair passenger to stop the lift at different elevations relative to the vehicle's interior. The wheelchair passenger must still be able to open the rollstop gate to disembark the platform, independent of whether the platform is fully lowered or not. There is therefore a need for an improved wheelchair lift hydraulic circuit capable of independently isolating and controlling folding and unfolding operations, raising and lowering operations, and rollstop engaging and disengaging operations. The present invention addresses this need.

SUMMARY OF THE INVENTION

One embodiment of the present invention relates to a hydraulic circuit capable of independently controlling the actuation of a plurality of hydraulic cylinders. One embodiment of the present invention relates to a hydraulic circuit for independently controlling the stowage functions, vertical movement, and rollstop operations of a wheelchair-lifting platform. Another more preferred embodiment of the present invention relates to a wheelchair lifting platform having a lifting cylinder and a rollstop cylinder and incorporating a hydraulic circuit capable of independently controlling the respective cylinders.

DETAILED DESCRIPTION OF THE PREFERRED EMBODIMENT

Figure 1:
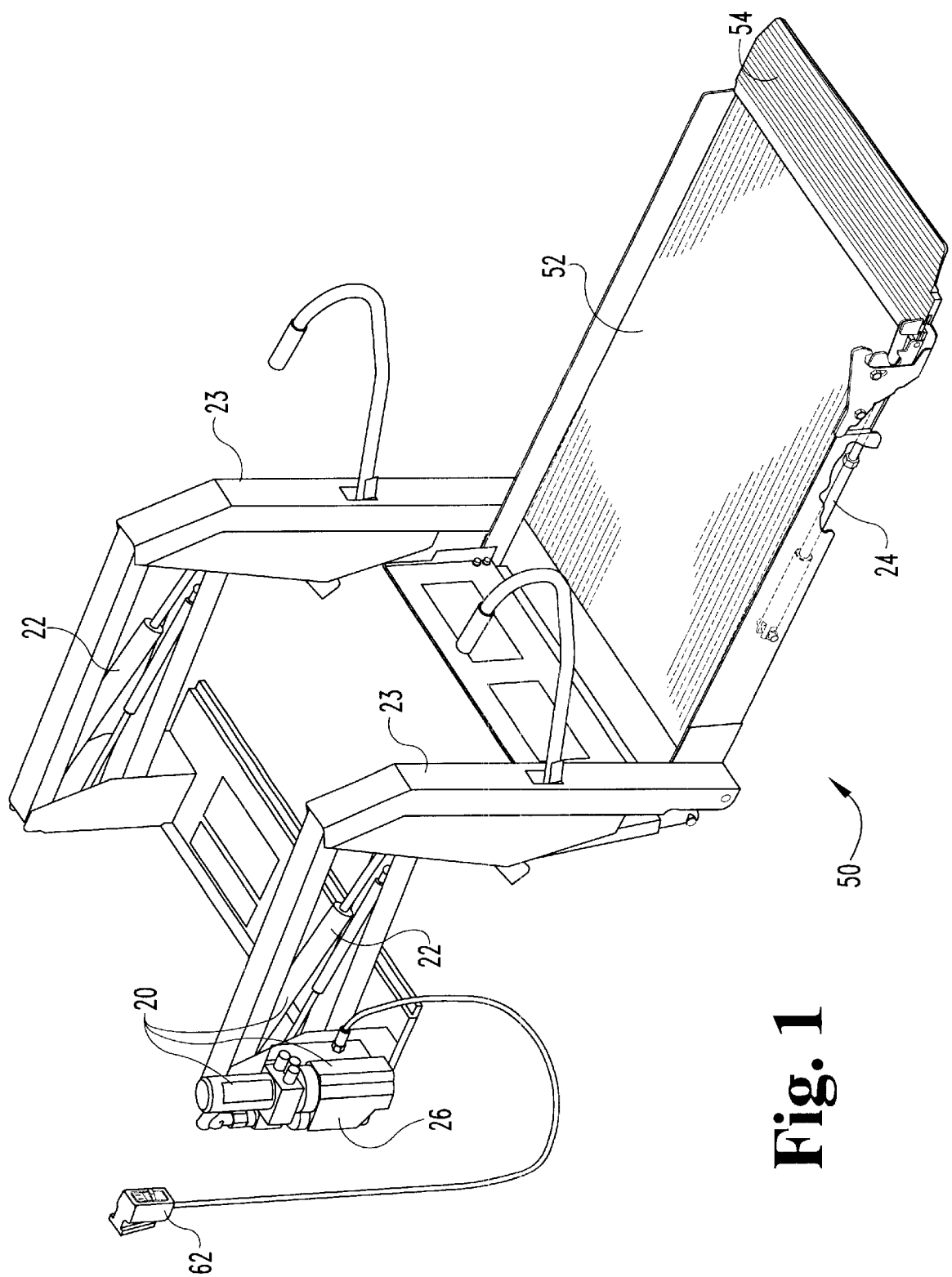
FIG. 1 is a perspective view of a hydraulic wheelchair lift of a first embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
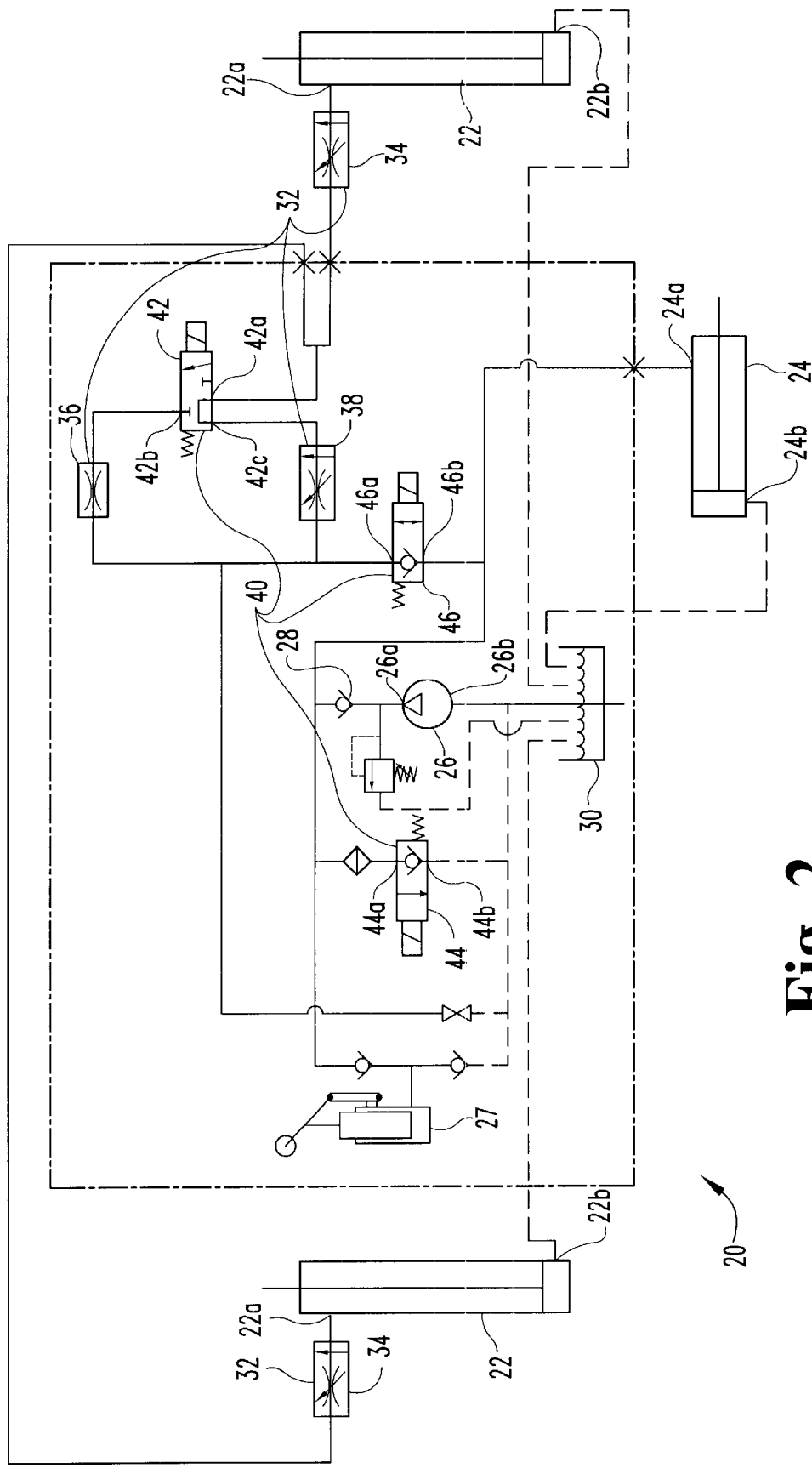
FIG. 2 is a schematic diagram of a first embodiment hydraulic circuit used in the hydraulic wheelchair lift of FIG. 1.

FIG. 1 illustrates a typical wheelchair lift 50 incorporating a first embodiment hydraulic circuit 20, illustrated in detail in FIG. 2. Wheelchair lift 50 includes a platform 52 having a pivotable rollstop 54. Platform 52 is coupled to primary hydraulic lifting cylinders 22 through lifting arms 23 and is adapted to travel vertically upon actuation of primary hydraulic lifting cylinders 22. Rollstop 54 is operationally coupled to a secondary hydraulic rollstop cylinder 24, and is opened and closed by actuation of the secondary hydraulic rollstop cylinder 24. Wheelchair lift 50 may be coupled to a vehicular frame (not shown) such as that of a van or bus, for example. Wheelchair lift 50 also includes a control 62 coupled to hydraulic circuit 20 and adapted to selectively energize pump 26 and isolation valve set 40 (see FIG. 2).

FIG. 2 is a schematic representation of a first embodiment of the present invention, a hydraulic circuit 20 for controlling a first moving member coupled to a second moving member, such as the lifting platform 52 coupled to the rollstop gate 54 (see FIG. 1). The hydraulic circuit 20 includes at least one primary hydraulic lifting cylinder 22 for actuating unfolding and folding operations, as well as for actuating raising and lowering operations of the lifting platform 52. The primary hydraulic lifting cylinder 22 includes a main fluid port 22a for the transportation of fluid into and out of the primary hydraulic lifting cylinder 22. The primary hydraulic lifting cylinder 22 also includes an auxiliary fluid drainage port 22b for conveying excess fluid out of the primary hydraulic lifting cylinder 22. In the preferred embodiment, there are two primary hydraulic lifting cylinders 22. The hydraulic circuit 20 also includes a secondary hydraulic rollstop cylinder 24 for raising and lowering the rollstop gate 54 operationally coupled thereto. The secondary hydraulic rollstop cylinder 24 includes a main fluid port 24a and an auxiliary fluid drainage port 24b. The rollstop gate 54 may be mechanically biased in the open position by a spring or the like, as is know in the prior art. A motorized hydraulic pump 26 is fluidically coupled to the rest of the hydraulic circuit 20 through a one-way check valve 28 for pressurizing the primary hydraulic cylinders 22 to actuate raising/lowering and folding/unfolding operations and for pressurizing the secondary hydraulic rollstop cylinder 24 to actuate gate opening/closing operations, respectively. Pump 26 includes a fluid inlet 26a and a fluid outlet 26b. Additionally, a manual pump 27 may be fluidically positioned in circuit 20 to actuate hydraulic cylinders 22, 24 if so desired, such as in the event of failure of pump 26. The unfolding and lowering operations are preferably actuated by gravity, but may be hydraulically actuated. Actuation of the unfolding operation may be further assisted by springs (not shown) or the like. A hydraulic fluid reservoir 30 is also included in the hydraulic circuit 20, fluidically coupled to the pump fluid inlet 26a to supply hydraulic fluid thereto and fluidically coupled to the auxiliary drainage ports 22b, 24b to receive excess fluid therefrom.

The hydraulic circuit 20 further includes a plurality of hydraulic flow control valves 32 to limit the speeds of the various operations to predetermined maximum values. For example, the hydraulic circuit 20 includes a flow control valve 34 fluidically coupled to each primary hydraulic cylinder 22. The hydraulic circuit 20 also includes an unfold orifice 36 to control the speed of the unfold operation. The hydraulic circuit 20 further includes a compensator valve 38 to control the platform descent speed during the unpowered, gravity driven platform-lowering operation.

The hydraulic circuit 20 also includes a set of energizeable isolation valves 40, each having a de-energized mode and an energized mode. These include an unfold valve 42 positioned in fluidic communication between the primary hydraulic cylinders 22 and the pump 26, a down valve 44 positioned in fluidic communication between both the primary hydraulic lifting cylinders 22 and the secondary hydraulic rollstop cylinder 24 and the pump 26, and the bridging valve 46 positioned in fluidic communication between the primary hydraulic lifting cylinders 22 and the rest of the hydraulic circuit 20. The unfold valve 42 includes a first unfold valve port 42a, a second unfold valve port 42b, and a third unfold valve port 42c. The down valve 44 includes a first down valve port 44a and a second down valve port 44b. The bridging valve includes a first bridging valve port 46a and a second bridging valve port 46b.

Specifically, the first unfold valve port 42a is coupled in fluidic communication with the primary hydraulic lifting cylinder main fluid port 22a. The first bridging valve port 46a is coupled in fluidic communication with the second unfold valve port 42b and with the third unfold valve port 42c. The secondary hydraulic rollstop cylinder main port 24a is coupled in fluidic communication with the second bridging valve port 46b. The secondary hydraulic rollstop cylinder auxiliary drainage port 24b is coupled fluidically with the fluid reservoir 30. The first down valve port 44a is coupled in fluidic communication with the second bridging valve port 46b. The second down valve port 44b is coupled in fluidic communication with the fluid reservoir 30, as is the pump inlet 26a. The pump outlet 26b is coupled in fluidic communication with the first down valve port 44a, the second bridging valve port 46b, and the secondary hydraulic rollstop cylinder main port 24a. The unfold orifice 36 is fluidically coupled between the second unfold valve port 42b and the first bridging valve port 46a to govern the rate of fluid flow therethrough. The compensator valve 38 is fluidically coupled between the third unfold valve port 42c and the first bridging valve port 46a to regulate the rate of fluid flow therethrough. Preferably, the fluid flow rate through the compensator valve 38 is more rapid than the fluid flow rate through the unfold orifice 36.

Figure 4:
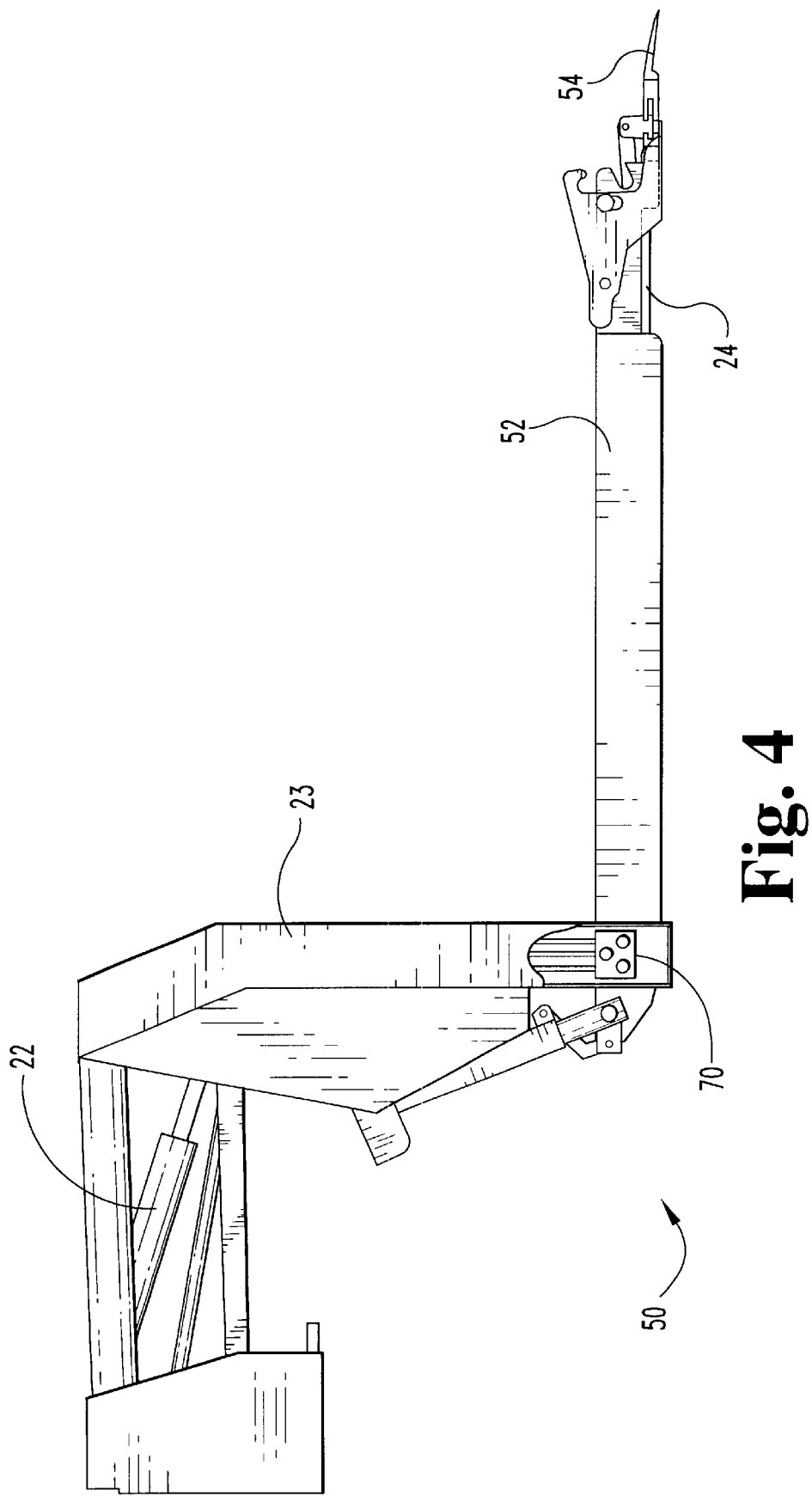
FIG. 4 is a partially cut-away side elevational view of the hydraulic wheelchair lift of FIG. 1, showing the bridging switch.

The hydraulic circuit 20 allows independent operation of the primary hydraulic lifting cylinders 22 and the secondary hydraulic rollstop cylinder 24, which is particularly desirable in the case of a bridging event. Upon the occurrence of a bridging event, the rollstop gate 54 of a wheelchair lift 50 is lowered while the platform 52 is stopped and locked into any position along its downward travel during the lowering operation. A bridging event may happen, for example, when the platform encounters uneven ground, an obstacle such as a sizeable rock, tree stump, or curb upon lowering. The energizeable isolation valves 40 are electrically coupled to electrical controls or actuator switches 62 (see FIG. 1). Additionally, a sensor switch 70 (see FIG. 4) adapted to detect when the lowering operation is interrupted by an obstacle (i.e., the occurrence of a bridging event) may be electrically coupled to the isolation valve set 40. The sensor switch 40 is adapted to trip when it senses a predetermined amount of pivoting movement of the platform 52 relative to the lifting arm 23. While the various circuit elements 22, 24, 26, 28 and 30 remain fluidically coupled, the energizeable valve set 40 selectively enables and/or disables fluid communication between combinations of circuit elements 22, 24, 26, 28 and 30 to selectively operationally isolate various circuit functions.

During the platform 52 unfold operation, which is selected by means of control 62, pump 26 is de-energized and all three isolation valves 40 are energized to allow fluid to flow from the primary hydraulic cylinders 22 through the unfold orifice 36 and down valve 44 to the reservoir 30. During this operation, only a fraction of the fluid stored in the primary hydraulic lifting cylinders 22 is drained; the hydraulic circuit 20 accordingly remains under positive pressure from the primary hydraulic lifting cylinders 22 throughout the unfold operation. The secondary hydraulic rollstop cylinder 24 is fluidically coupled to the primary hydraulic lifting cylinders 22 via the bridging valve 46 during this operation, and so remains pressurized.

During the platform 52 lowering operation, which is selected by means of control 62, the unfold valve 42 is de-energized while the down valve 44 and the bridging valve 46 remain energized. Pump 26 remains de-energized. Hydraulic fluid flows from the primary hydraulic lifting cylinders 22 through the compensator valve 38 during this operation. The hydraulic circuit 20, including the secondary hydraulic rollstop cylinder 24, remains under positive hydraulic pressure from the primary hydraulic cylinders 22 throughout the lowering operation. By using the unfold valve 42 to redirect fluid flow from the unfold orifice 36 to the compensator valve 38, different speeds may be obtained for the unfold and platform lowering operations.

During a bridging event, which is sensed by sensor switch 70 (see FIG. 4), the bridging valve 46 is de-energized while the down valve 44 is still energized, thereby isolating the primary hydraulic lifting cylinders 22 from the pump 26 and the secondary hydraulic rollstop cylinder 24. Unfold valve 42 remains de-energized during bridging. This configuration of the hydraulic circuit 20 prevents hydraulic fluid flow from the primary hydraulic lifting cylinders 22, stopping the platform 52 from further travel (i.e. stopping the platform 52 in the bridged position), while allowing fluid to flow from the secondary hydraulic rollstop cylinder 24, through the down valve 44 and to the reservoir 30, thereby actuating the lowering of the rollstop gate 54. During a bridging event, the bridging valve 46 may be manually de-energized or may be automatically de-energized by actuation of the sensor switch 70 (see FIG. 4).

During the raising and folding operations, which are selected by means of control 62, the pump 26 is energized. Fluid is routed into the primary hydraulic lifting cylinders 22 and the secondary hydraulic rollstop cylinder 24 by de-energizing the isolation valves 40. Pressurization of the secondary hydraulic rollstop cylinder 24 results in the retraction of the rollstop gate 54 to its raised position, and pressurization of the primary hydraulic lifting cylinders 22 raises (and eventually folds) the platform 52.

During stowage, the pump 26 is de-energized while the bridging valve 46 is de-energized. The de-energized bridging valve 46 prevents fluid from draining from the primary hydraulic lifting cylinders 22 and therefore locks the platform 52.

Figure 3:
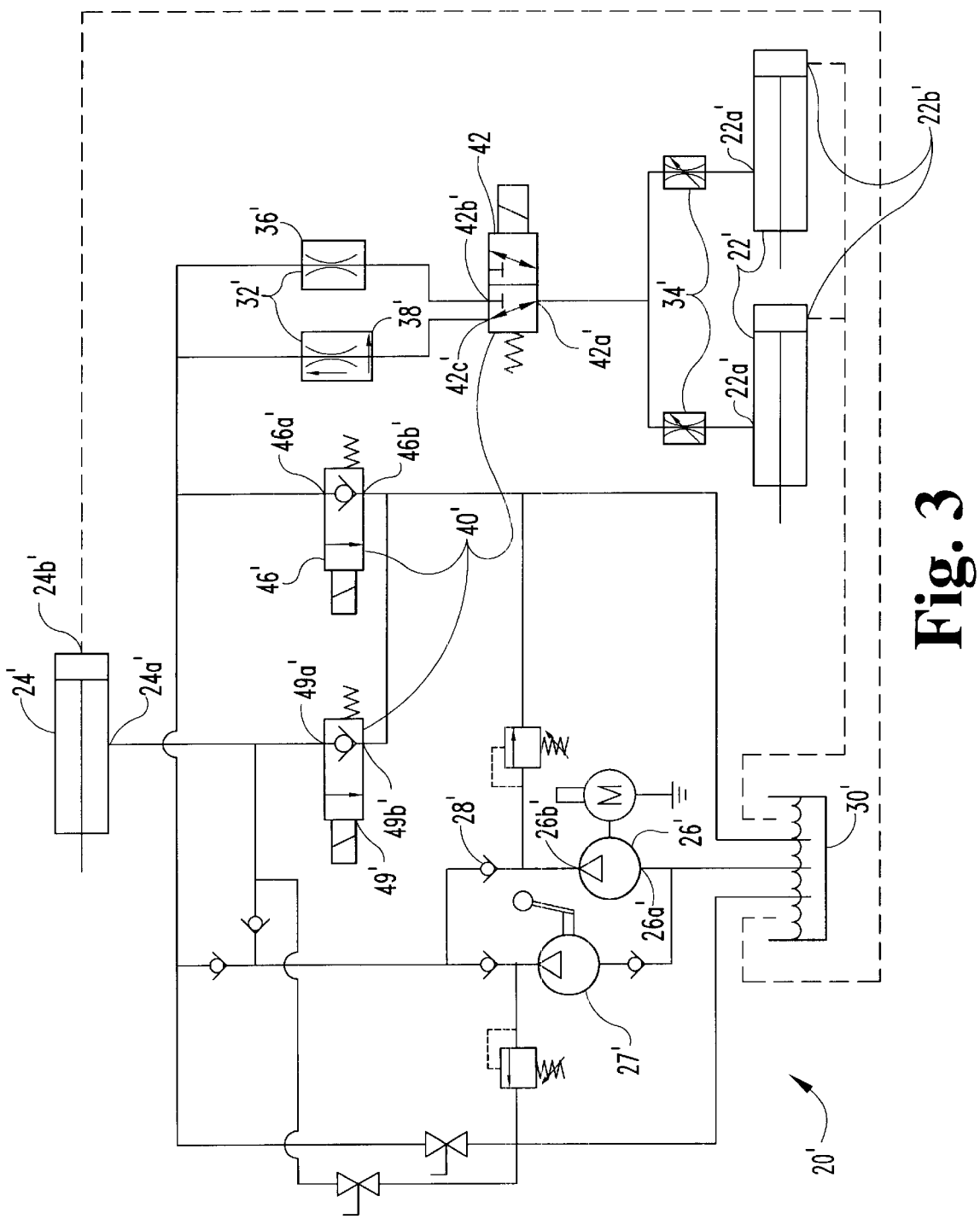
FIG. 3 is a schematic diagram of a second embodiment hydraulic circuit used in the hydraulic wheelchair lift of FIG. 1.

FIG. 3 is a schematic representation of a second embodiment of the present invention, a hydraulic circuit 20' for controlling the lifting platform 52 coupled to the rollstop gate 54 of the wheelchair lift of FIG. 1. As shown in FIG. 3, the hydraulic circuit 20' includes primary hydraulic lifting cylinders 22' for actuating the platform 52 unfolding and folding operations, as well as for raising and lowering the platform 52 (see FIG. 1). The primary hydraulic lifting cylinders 22' include main fluid ports 22a'
and auxiliary fluid drainage ports 22b'. The hydraulic circuit 20' also includes a secondary hydraulic rollstop cylinder 24' for raising and lowering the rollstop gate 54 operationally coupled thereto. The secondary hydraulic rollstop cylinder 24' includes a main fluid port 24a' and an auxiliary fluid drainage port 24b'. A motorized pump 26' is fluidically coupled to the hydraulic circuit 20' through a one-way check valve 28' for pressurizing the primary hydraulic lifting cylinders 22' to actuate raising/lowering and folding/unfolding operations and also for pressurizing the secondary rollstop cylinder 24' for gate opening/closing operations. The pump 26' includes a fluid inlet 26a' and a fluid outlet 26b'. The unfolding and lowering operations are actuated by gravity and may be further assisted by springs (not shown) or the like. A hydraulic reservoir 30' is also included in fluidic communication with the rest of the hydraulic circuit 20', fluidically coupled to the pump 26' to supply hydraulic fluid thereto and fluidically coupled to the hydraulic cylinders 22', 24' to receive excess fluid therefrom.

The hydraulic circuit 20' further includes a plurality of hydraulic flow control valves 32' to limit the speeds of the various operations to predetermined maximum values, such as an unfold orifice 36' fluidically positioned in circuit 20' to control the speed of the unfold operation. The hydraulic circuit also may include a compensator valve 38' to control the platform descent speed during the unpowered, gravity driven platform-lowering operation.

The hydraulic circuit 20' also includes a set of energizeable isolation valves 40', each having a de-energized mode and an energized mode these include an unfold valve 42', a bridging valve 46' and a rollstop valve 49'. The unfold valve 42' includes a first unfold valve port 42a', a second unfold valve port 42b', and a third unfold valve port 42c'. The bridging valve 46 includes a first bridging valve port 46a' and a second bridging valve port 46b'. The rollstop valve 49' includes a first rollstop valve port 49a' and a second rollstop valve port 49b'.

Specifically, the first unfold valve port 42a' is coupled in fluidic communication with the primary hydraulic lifting cylinder main ports 22a'. The first bridging valve port 46a' is coupled in fluidic communication with the second unfold valve port 42b' and with the third unfold valve port 42c'. The secondary hydraulic rollstop cylinder main port 24a is coupled in fluidic communication with the first rollstop valve port 49a'. The rollstop valve 49' is coupled in fluidic communication between the second bridging valve port 46b' and the secondary hydraulic rollstop cylinder main port 24a'. The pump outlet 26b' is coupled in fluidic communication with the second and third unfold valve ports 42b' and 42c', the first rollstop valve port 49a', the first bridging valve port 46a', and the secondary hydraulic rollstop cylinder main port 24a. The unfold orifice 36' is fluidically coupled between the second unfold valve port 42b' and the first bridging valve port 46a' to govern the rate of fluid flow therethrough. The compensator valve 38' is fluidically coupled between the third unfold valve port 42c' and the first bridging valve port 46a' to regulate the rate of fluid flow therethrough. Preferably, the fluid flow rate through the compensator valve 38' is more rapid than the fluid flow rate through the unfold orifice 36'.

The energizeable isolation valves 40' are electrically coupled to electrical controls or actuator switches 62. Additionally, a sensor switch 70 (see FIG. 4) adapted to detect when an obstacle interrupts the platform lowering operation (i.e., a bridging event) may be electrically coupled to the isolation valve set 40'. Additionally, a manual pump 27' may be fluidically positioned in circuit 20' to actuate cylinders 22', 24' in the event of failure of primary pump 26'.

During the platform 52 unfold operation, which is selected by means of control 62, pump 26' is de-energized and both unfold valve 42' and bridging valve 46' are energized to allow fluid to flow from the primary hydraulic cylinders 22' through the unfold orifice 36' to the reservoir 30'. During this operation, only a fraction of the fluid stored in the primary hydraulic cylinders 22' is drained; the hydraulic circuit 20' accordingly remains under positive pressure from the primary hydraulic cylinders 22' throughout the unfold operation. Rollstop valve 49' remains de-energized. The secondary hydraulic rollstop cylinder 24' is fluidically coupled to the primary hydraulic lifting cylinders 22' via the bridging valve 46' and the rollstop valve 49' during this operation, and so remains pressurized.

During the platform 52 lowering operation, which is selected by means of control 62, the unfold valve 42' is de-energized while bridging valve 46' remains energized. The rollstop valve 49' and the pump 26' remain de-energized. Hydraulic fluid flows from the primary hydraulic lifting cylinders 22' through the compensator valve 38' during this operation. The hydraulic circuit 20', including the secondary hydraulic rollstop cylinder 24', remains under positive hydraulic pressure from the primary hydraulic lifting cylinders 22' throughout the lowering operation. By using the unfold valve 42' to redirect fluid flow from the unfold orifice 36' to the compensator valve 38', different speeds may be obtained for the unfold and platform lowering operations.

During a bridging event, which is sensed by sensor switch 70 (see FIG. 4), the bridging valve 46' is de-energized, substantially preventing the flow of fluid from the primary hydraulic cylinders 22'. This condition prevents the platform 52 from further travel (i.e. stops the platform 52 in the bridged position). The rollstop gate 54 may be deployed by energizing the now-isolated rollstop valve 49', allowing fluid to flow from the secondary hydraulic rollstop cylinder 24' to the reservoir 30'. During lowering, the bridging valve 46' may be manually de-energized or may be automatically de-energized by the sensor switch 70.

During the raising and folding operations, which are selected by means of control 62, the pump 26' is energized and the isolation valve set 40' is de-energized. Fluid is pressurized into the primary hydraulic lifting cylinders 22', first lifting and then folding the platform 52. Fluid is also pressurized into the secondary hydraulic rollstop cylinder 24', raising the rollstop gate 54.

During stowage, the pump 26' is de-energized and bridging valve 46' is deenergized to prevent fluid flow through the system, thereby locking the platform 52.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are to be desired to be protected.

What is claimed is:

1. A hydraulic circuit in a wheelchair lifting platform, comprising:

a foldable platform structure for carrying a passenger;

a moveable rollstop gate pivotally connected to the platform structure raisable for the safety of the passenger;

a fluid reservoir;

a primary hydraulic lifting cylinder having a primary hydraulic lifting cylinder main port and having a primary hydraulic lifting cylinder auxiliary drainage port in fluidic communication with said fluid reservoir for lifting the platform structure with the primary hydraulic cylinder;

an unfold valve having a first unfold valve port in fluidic communication with said primary hydraulic lifting cylinder main port, said unfold valve further having a second unfold valve port and a third unfold valve port, and said unfold valve having a first unfold valve position and a second unfold valve position for unfolding the platform structure with the primary cylinder;

a bridging valve having a first bridging valve port in fluidic communication with said second unfold valve port and said third unfold valve port, said bridging valve further having a second bridging valve port, and said bridging valve having a first bridging valve position and a second bridging valve position;

a secondary hydraulic rollstop cylinder having a secondary hydraulic rollstop cylinder main port in fluidic communication with said second bridging valve port, and said secondary hydraulic rollstop cylinder further having a secondary hydraulic rollstop cylinder auxiliary drainage port in fluidic communication with said fluid reservoir for moving the rollstop gate with the secondary cylinder;

a down valve having a first down valve port in fluidic communication with said second bridging valve port, said down valve further having a second down valve port in fluidic communication with said fluid reservoir, and said down valve having a first down valve position and a second down valve position;

a pump having a pump inlet in fluidic communication with said fluid reservoir, and said pump further having a pump outlet in fluidic communication with said first down valve port, said second bridging valve port, and said secondary hydraulic rollstop cylinder main port;

wherein placing said unfold valve in said first unfold valve position, said down valve in said first down valve position, and said bridging valve in said first bridging valve position and de-energizing said pump actuates fluid flow from said primary hydraulic lifting cylinder to said reservoir;

wherein placing said down valve in said first down valve position and said bridging valve in said first bridging valve position, placing said unfold valve in said second unfold valve position and de-energizing said pump actuates fluid flow from said primary hydraulic lifting cylinder to said reservoir;

wherein placing said bridging valve in said second bridging valve position and said unfold valve in said second unfold valve position, placing said down valve in said first down valve position and de-energizing said pump prevents fluid flow from said primary hydraulic lifting cylinder and actuates fluid flow from said secondary hydraulic rollstop cylinder; and wherein placing said bridging valve in said second bridging valve position, said down valve in said second down valve position and said unfold valve in said second unfold valve position and energizing said pump actuates fluid flow into said primary hydraulic lifting cylinder.

2. The hydraulic circuit of claim 1, further including:

an unfold orifice fluidically coupled between said second unfold valve port and said first bridging valve port; and a compensator valve fluidically coupled between said third unfold valve port and said first bridging valve port;

wherein placing said unfold valve in said first unfold valve position, said down valve in said first down valve position and said bridging valve in said first bridging valve position and de-energizing said pump actuates relatively slow fluid flow from said primary hydraulic lifting cylinder through said unfold orifice to said reservoir; and wherein placing said down valve in said first down valve position and said bridging valve in said first bridging valve position, placing said unfold valve in said second unfold valve position and deenergized said pump actuates relatively rapid fluid flow from said primary hydraulic lifting cylinder through said compensator valve to said reservoir.

3. A hydraulic circuit in a wheelchair lifting platform, comprising:

a foldable platform structure for carrying a passenger;

a moveable rollstop gate pivotally connected to the platform structure raisable for the safety of the passenger;

a hydraulic fluid reservoir;

a hydraulic fluid pressurizer in fluidic communication with said reservoir and adapted to provide pressurized hydraulic fluid;

a hydraulic lifting cylinder for lifting the platform structure in fluidic communication with said hydraulic fluid pressurizer;

a hydraulic rollstop cylinder for moving the rollstop gate in fluidic communication with said hydraulic fluid pressurizer and said hydraulic lifting cylinder;

a selectively energizeable bridging valve fluidically disposed between said hydraulic lifting cylinder and said hydraulic rollstop cylinder, said hydraulic fluid pressurizer, and said hydraulic fluid reservoir and adapted to selectively disable fluidic communications between said hydraulic lifting cylinder and said hydraulic rollstop cylinder;

an unfold orifice fluidically disposed between said hydraulic lifting cylinder and said selectively energizeable bridging valve;

a compensator valve fluidically disposed between said hydraulic lifting cylinder and said selectively energizeable bridging valve;

a selectively energizeable unfold valve for unfolding the platform structure with the hydraulic lifting cylinder fluidically disposed with said selectively energizeable bridging valve and adapted to selectively direct fluid flow therebetween through said unfold orifice and said compensator valve; and a selectively energizeable down valve fluidically disposed between said hydraulic fluid reservoir and both said hydraulic lifting cylinder and said hydraulic rollstop cylinder and adapted to selectively disrupt fluidic communication therebetween.

4. A hydraulic circuit in a wheelchair lifting platform, comprising:

a foldable platform structure for carrying a passenger;

a moveable rollstop gate pivotally connected to the platform structure raisable for the safety of the passenger;

a fluid reservoir;

a primary hydraulic lifting cylinder having a primary hydraulic lifting cylinder main port and having a primary hydraulic lifting cylinder auxiliary drainage port in fluidic communication with said fluid reservoir for lifting the platform structure with the primary cylinder;

an unfold valve having a first unfold valve port in fluidic communication with said primary hydraulic lifting cylinder main port, said unfold valve further having a second unfold valve port and a third unfold valve port, and said unfold valve having a first unfold valve position and a second unfold valve position for unfolding the platform structure with the primary cylinder;

a bridging valve having a first bridging valve port in fluidic communication with said second unfold valve port and said third unfold valve port, said bridging valve further having a second bridging valve port, and said bridging valve having a first bridging valve position and a second bridging valve position;

a secondary hydraulic rollstop cylinder having a secondary hydraulic rollstop cylinder main port, and said secondary hydraulic rollstop cylinder further having a secondary hydraulic rollstop cylinder auxiliary drainage port in fluidic communication with said fluid reservoir for moving the rollstop gate with the secondary cylinder;

a rollstop valve having a first rollstop valve port in fluidic communication with said secondary hydraulic rollstop cylinder main port, said rollstop valve further having a second rollstop valve port in fluidic communication with said second bridging valve port, and said rollstop valve having a first rollstop valve position and a second rollstop valve position;

a pump having a pump inlet in fluidic communication with said fluid reservoir, and said pump further having a pump outlet in fluidic communication with said first down valve port, said second bridging valve port, and said secondary hydraulic rollstop cylinder main port;

wherein placing said unfold valve in said first unfold valve position and said bridging valve in said first bridging valve position and deenergizing said pump actuates fluid flow from said primary hydraulic lifting cylinder to said reservoir;

wherein placing said unfold valve in said second unfold valve position and said bridging valve in said fiat bridging valve position and de-energizing said pump actuates fluid flow from said primary hydraulic lifting cylinder to said reservoir;

wherein placing said rollstop valve in said first rollstop valve position and said bridging valve in said second bridging valve position and de-energizing said pump prevents fluid flow from said primary hydraulic lifting cylinder and actuates fluid flow from said secondary rollstop cylinder to said reservoir, and wherein placing said bridging valve in said second bridging valve position, said rollstop valve in said second rollstop valve position and energizing said pump actuates fluid flow into said primary hydraulic lifting cylinder and said secondary hydraulic rollstop cylinder.

* * * * *